United States Patent
Jeong

(10) Patent No.: US 8,059,736 B2
(45) Date of Patent: Nov. 15, 2011

(54) ORTHOGONAL FREQUENCY DIVISION MULTIPLEXING RECEIVER

(75) Inventor: Jun Young Jeong, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 815 days.

(21) Appl. No.: 12/129,722

(22) Filed: May 30, 2008

(65) Prior Publication Data
US 2009/0274223 A1    Nov. 5, 2009

(30) Foreign Application Priority Data

Apr. 30, 2008   (KR) .................. 10-2008-0040875

(51) Int. Cl.
*H04L 27/28* (2006.01)
(52) U.S. Cl. ....................................... 375/260
(58) Field of Classification Search .......... 375/260, 375/130, 147, 335, 326; 370/203, 208, 430, 370/355; 342/458
See application file for complete search history.

(56) References Cited

U.S. PATENT DOCUMENTS

| | | | |
|---|---|---|---|
| 7,088,672 B2* | 8/2006 | Kim | 370/208 |
| 7,227,834 B1 | 6/2007 | Barton et al. | |
| 7,684,359 B2* | 3/2010 | Kim et al. | 370/319 |
| 2006/0176802 A1* | 8/2006 | Ko et al. | 370/208 |
| 2007/0211809 A1 | 9/2007 | Kim | |

FOREIGN PATENT DOCUMENTS

| | | |
|---|---|---|
| JP | 2000-295195 | 10/2000 |
| KR | 1020060016580 A | 2/2006 |

* cited by examiner

*Primary Examiner* — Khai Tran
(74) *Attorney, Agent, or Firm* — Volentine & Whitt, PLLC

(57) ABSTRACT

In one aspect, an orthogonal frequency division multiplexing (OFDM) receiver includes an offset compensator, a fast Fourier transform (FFT) block, a control unit, a channel impulse response estimation block, and a sampling offset estimation block. The offset compensator is configured to receive a digital input signal and a sampling offset, and to convert the digital input signal into a baseband signal in accordance with the sampling offset. The fast Fourier transform (FFT) block is configured to perform an FFT operation of the base band signal output from the offset compensator and to output a corresponding FFT result. The control unit is configured to generate OFDM symbol information and a plurality of control signals based on the FFT result. The channel impulse response estimation block is configured to periodically generate receiving channel impulse response information of a receiving channel based on the FFT result. The sampling offset estimation block is configured to generate the sampling offset based on the FFT result, the receiving channel impulse response information, the OFDM symbol information, and the plurality of control signals.

23 Claims, 7 Drawing Sheets

ORTHOGONAL FREQUENCY DIVISION MULTIPLEXING RECEIVER

CROSS-REFERENCE TO RELATED APPLICATION

A claim of priority is made to Korean Patent Application No. 10-2008-0040875, filed Apr. 30, 2008, in the Korean Intellectual Property Office, the disclosure of which is incorporated herein in its entirety by reference.

FIELD OF THE INVENTION

The present invention generally relates to digital communication systems, and more particularly, the present invention relates to an orthogonal frequency division multiplexing (OFDM) receiver.

BACKGROUND OF THE INVENTION

Digital communication systems are known which utilize orthogonal frequency division multiplexing (OFDM) modulators/demodulators to modulate and demodulate quadrature amplitude modulation (QAM) coded signals. In OFDM, data is transmitted in parallel using orthogonal sub-carriers, and an equalizer functions to compensate for channel distortion in each sub-channel.

OFDM has been increasingly adopted in high-speed multimedia data transmission systems (e.g., digital broadcasting). Exemplary systems include x digital subscriber line (xDSL), Wifi, Wimax, digital multimedia broadcasting (DMB), digital video broadcasting terrestrial-handheld (DVB-T/H), and integrated services digital broadcasting-terrestrial (ISDB-T).

OFDM communication systems exhibit reduced communication errors and relatively high communication quality by executing synchronization between a transmitting signal and a receiving signal before data transmission/reception between a transmitter and a receiver. Usually, synchronization functionality in OFDM communication systems is separated into frequency synchronization for equalizing the carrier frequency of a transmitter with that of a receiver, and time synchronization for determining a start point of an OFDM symbol.

However, even when exact synchronization is accomplished at the beginning of transmission/reception, the start point of a symbol drifts with the lapse of time. This is because a sampling clock of a transmitter is not (and cannot) be the same as that of a receiver. The result is a sampling offset which must be periodically compensated for in the synchronization scheme. This is done by periodically sending a recognizable symbol to the receiver, or by sending a pilot signal to the receiver whose position is recognized by the receiver. The receiver utilizes the symbol or pilot signal to estimate a sampling offset. However, this approach suffers a drawback since external signal interference (e.g., analog broadcasting signals) can introduce errors in the symbol or signal received by the receiver.

SUMMARY OF THE INVENTION

According to an aspect of the present invention, an orthogonal frequency division multiplexing (OFDM) receiver includes an offset compensator, a fast Fourier transform (FFT) block, a control unit, a channel impulse response estimation block, and a sampling offset estimation block. The offset compensator is configured to receive a digital input signal and a sampling offset, and to convert the digital input signal into a baseband signal in accordance with the sampling offset. The fast Fourier transform (FFT) block is configured to perform an FFT operation of the base band signal output from the offset compensator and to output a corresponding FFT result. The control unit is configured to generate OFDM symbol information and a plurality of control signals based on the FFT result. The channel impulse response estimation block is configured to periodically generate receiving channel impulse response information of a receiving channel based on the FFT result. The sampling offset estimation block is configured to generate the sampling offset based on the FFT result, the receiving channel impulse response information, the OFDM symbol information, and the plurality of control signals.

According to another aspect of the present invention, an orthogonal frequency division multiplexing (OFDM) receiver includes a sampling offset estimation block and an offset compensator. The sampling offset estimation block is configured to generate a sampling offset based on a result of performing a fast Fourier transform (FFT) operation of a receiving signal, receiving channel impulse response information of a receiving channel, and OFDM symbol information and a plurality of control signals which are generated from a result of the FFT operation. The offset compensator is configured to compensate for the sampling offset of the receiving signal, convert the receiving signal into a baseband signal, and output the baseband signal.

BRIEF DESCRIPTION OF THE DRAWINGS

The above and other aspects and features of the present invention will become readily apparent from the detailed description that follows, with reference to the accompanying drawings, in which.

DETAILED DESCRIPTION OF EMBODIMENTS

Figure 1:
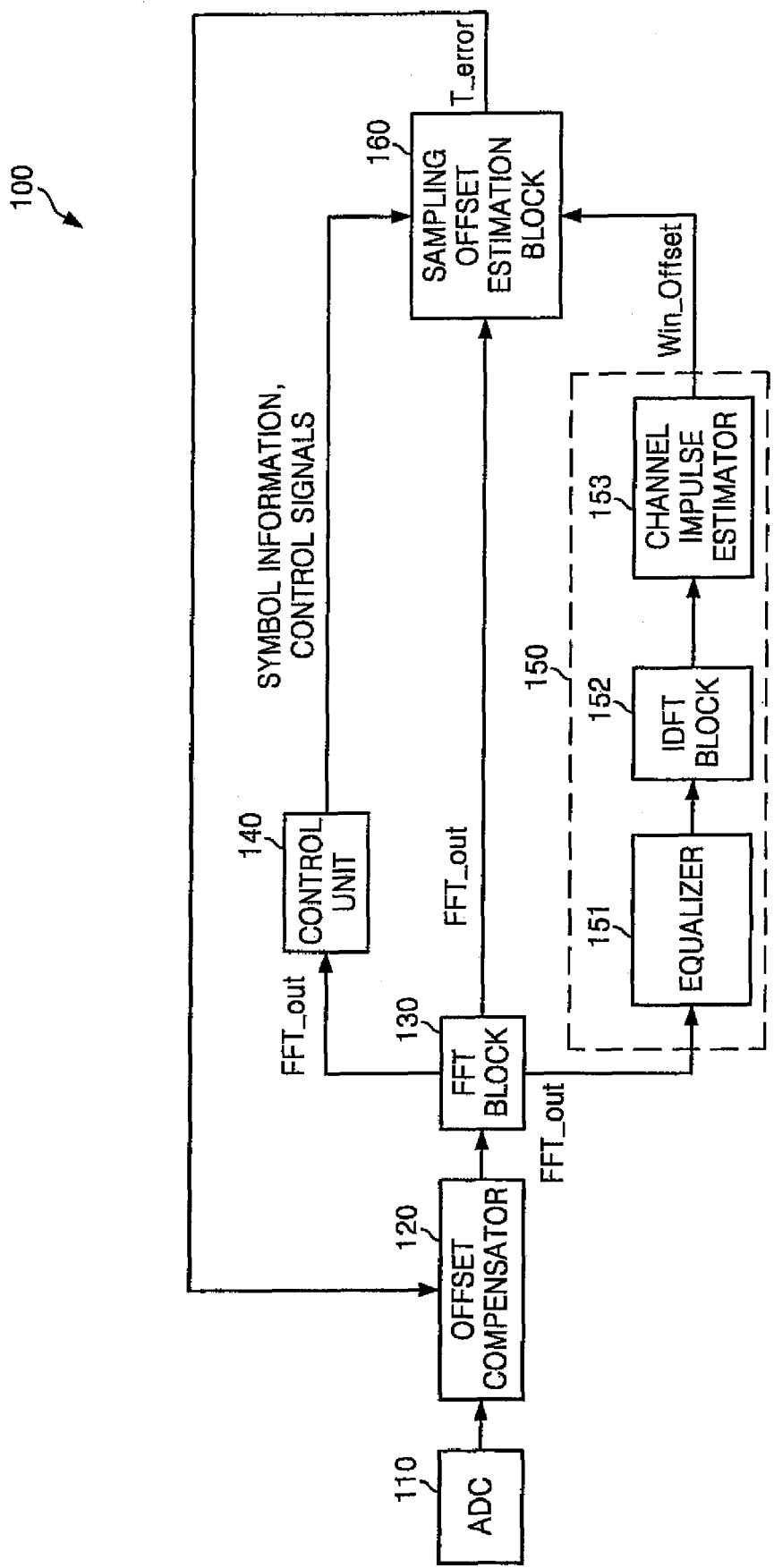
FIG. 1 is a block diagram of an orthogonal frequency division multiplexing (OFDM) receiver according to one or more embodiments of the present invention.

The present invention now will be described more fully with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

As is traditional in the field of the present invention, embodiments of the invention are described in terms of functional blocks or units. As one skilled in the art will appreciate, the functional blocks or units denote electronic circuits which are configured (e.g., by dedicated and/or programmable circuitry) to execute the signaling and/or computational operations described herein.

FIG. 1 is a block diagram of an orthogonal frequency division multiplexing (OFDM) receiver 100 according to one or more embodiments of the present invention.

As will be explained in more detail below, the OFDM receiver 100 of this embodiment(s) performs fine symbol synchronization using a continual pilot based sampling timing recovery (CPB STR) method, in which complex multiplication is performed of two consecutive OFDM symbols to eliminate a channel effect from a continual pilot at a particular position in each of the OFDM symbols, and then a sampling offset is estimated.

Referring to FIG. 1, the OFDM receiver 100 of FIG. 1 includes an analog-to-digital converter (ADC) 110, an offset compensator 120, a fast Fourier transform (FFT) block 130, a control unit 140, a channel impulse response estimation block 150, and a sampling offset estimation block 160.

The ADC 110 converts a radio frequency (RF) signal into a digital signal and outputs the digital signal. The RF signal may, for example, be received through an antenna (not shown).

The offset compensator 120 receives the digital signal output from the ADC 110 and a sampling offset T_error (output from the sampling offset estimation block, as explained later herein), and converts the digital signal into a baseband signal in accordance with the sampling offset T_error.

The FFT block 130 performs an FFT operation of the baseband signal output from the offset compensator 120, and outputs a resultant frequency-domain signal.

When the sampling offset T_error is not considered, a guard interval (GI)-removed FFT input may be expressed by Equation (1):

$$r_{l,n} = X_{l,k} \cdot H_{l,k} \cdot \exp\left(j\frac{2\pi k}{N}(n' - N_g - lN_s)\right) \cdot \exp\left(j\frac{2\pi \Delta k}{N}n'\right) \quad (1)$$

where $r_{l,n}$ is the FFT input, $X_{l,k}$ is a transmitting signal at an l-th symbol period and a k-th carrier, $H_{l,k}$ is an impulse response at the l-th symbol period and the k-th carrier, $N_s$ is the size of an OFDM signal, N is an FFT size, $N_g$ is the size of the GI, l is a symbol number, k is a sub-channel number, $\Delta k$ is a value obtained by normalizing a frequency offset value with respect to a frequency interval n'=n+$N_g$+l$N_s$, and n may vary from 0 to (N-1). Hereinafter, the description of the same reference symbols in Equations will be omitted. For clarity of the description, only sub-channel k is described, but, substantially, the number of sub-channels is commensurate with the FFT size.

When the sampling offset T_error is considered, the FFT input may be expressed by Equation (2):

$$r_{l,n} = \quad (2)$$
$$X_{l,k} \cdot H_{l,k} \cdot \exp\left(j\frac{2\pi k}{N}(n'(1+\zeta) - N_g - lN_s)\right) \cdot \exp\left(j\frac{2\pi \Delta k}{N}n'(1+\zeta)\right)$$

where $\xi$ is the sampling offset T_error and may be expressed in units of ppm (parts per million).

A result of performing the FFT operation of the k-th carrier may be expressed by Equation (3):

$$Y_{l,n} = \sum_{n=0}^{N-1} r_{l,n} \cdot \exp\left(-j\frac{2\pi k}{N}n\right) + ICI + Wn \quad (3)$$
$$= X_{l,k} \cdot H_{l,k} \cdot \exp\left(j\frac{2\pi}{N}(N_g + lN_s)\Phi_k\right) \cdot$$
$$\exp\left(j\pi\left(\frac{N-1}{N}\right)\right)\frac{\sin(\pi\Phi_k)}{\sin(\pi\Phi_k/N)} + ICI + Wn;$$
$$\Phi_k = k\zeta + \Delta k, \Delta k \cong 0$$

where ICI is an inter-carrier interference occurring because the orthogonality of carriers is broken by the frequency offset and the sampling offset T_error, and Wn is additive white Gaussian noise (AWGN). The FFT result obtained in Equation (3) is identified as FFT_out in FIGS. 1 through 3.

The control unit 140 generates OFDM symbol information and a plurality of control signals based on the FFT result FFT_out.

The channel impulse response estimation block 150 periodically generates impulse response information Win_Offset of a receiving channel based on the FFT result FFT_out.

In the example of FIG. 1, the channel impulse response estimation block 150 includes an equalizer 151 which compensates for a carrier distorted by the receiving channel with respect to the FFT result FFT_out, an inverse discrete Fourier transform (IDFT) block 152 which performs an IDFT operation of an output signal of the equalizer 151, and a channel impulse estimator 153 which generates the receiving channel impulse response information Win_Offset based on the IDFT result.

The sampling offset estimation block 160 generates the sampling offset T_error based on the FFT result FFT_out from the FFT block 130, the receiving channel impulse response information Win_Offset from the channel impulse response estimation block 150, and the OFDM symbol information and control signals from the control unit 140.

Figure 2:
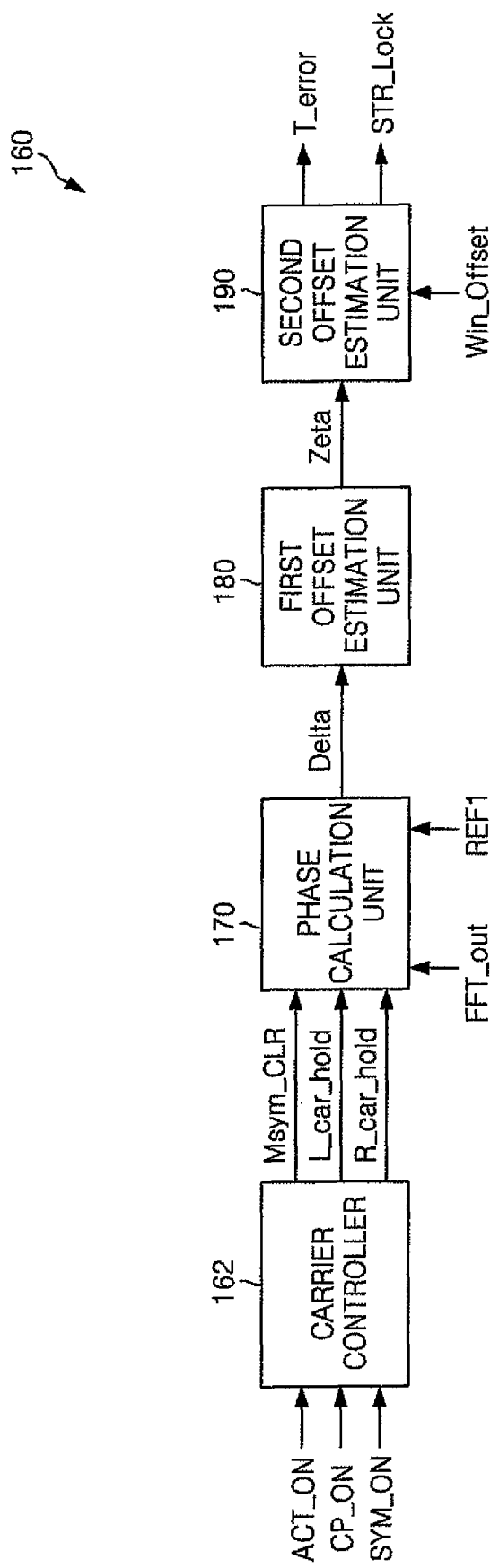
FIG. 2 is a block diagram of a sampling offset estimation block illustrated in FIG. 1 according to one or more embodiments of the present invention.

FIG. 2 is a block diagram of the sampling offset estimation block 160 illustrated in FIG. 1. Referring to FIG. 2, the sampling offset estimation block 160 of this example includes a carrier controller 162, a phase calculation unit 170, a first offset estimation unit 180, and a second offset estimation unit 190

The carrier controller 162 generates pilot carrier information L_car_hold and R_car_hold for classifying pilot carriers of an OFDM symbol into first pilot carriers and second pilot carriers according to positions and a cumulative symbol count Msym_CLR indicating the number of OFDM symbols with respect to which sampling offset estimation is performed based on the OFDM symbol information ACT_ON, CP_ON, and SYM_ON. The OFDM symbol information ACT_ON indicates the boundary of a valid symbol, the OFDM symbol information CP_ON indicates the position of a continual pilot, and the OFDM symbol information SYM_ON indicates the boundary of a symbol. The pilot carrier information L_car_hold indicates a pilot carrier whose phase leads that of a reference pilot carrier, which may be referred to as a "pilot carrier having a positive index", and the pilot carrier information R_car_hold indicates a pilot carrier whose phase lags that of the reference pilot carrier, which may be referred to as a "pilot carrier having a negative index".

The phase calculation unit 170 performs complex multiplication of a result of performing FFT of OFDM symbols as many in number as the cumulative symbol count Msym_CLR, and a result of delaying the FFT result for a predetermined OFDM symbol interval. Further, the phase calculation unit 170 classifies the complex multiplication result into the first pilot carriers (or pilot carriers having a positive index) and the second pilot carriers (or pilot carriers having a negative index) based on the pilot carrier information L_car_hold and R_car_hold, and then generates a phase difference Delta between the sum of phases of the first pilot carriers and the sum of phases of the second pilot carriers.

Figure 3:
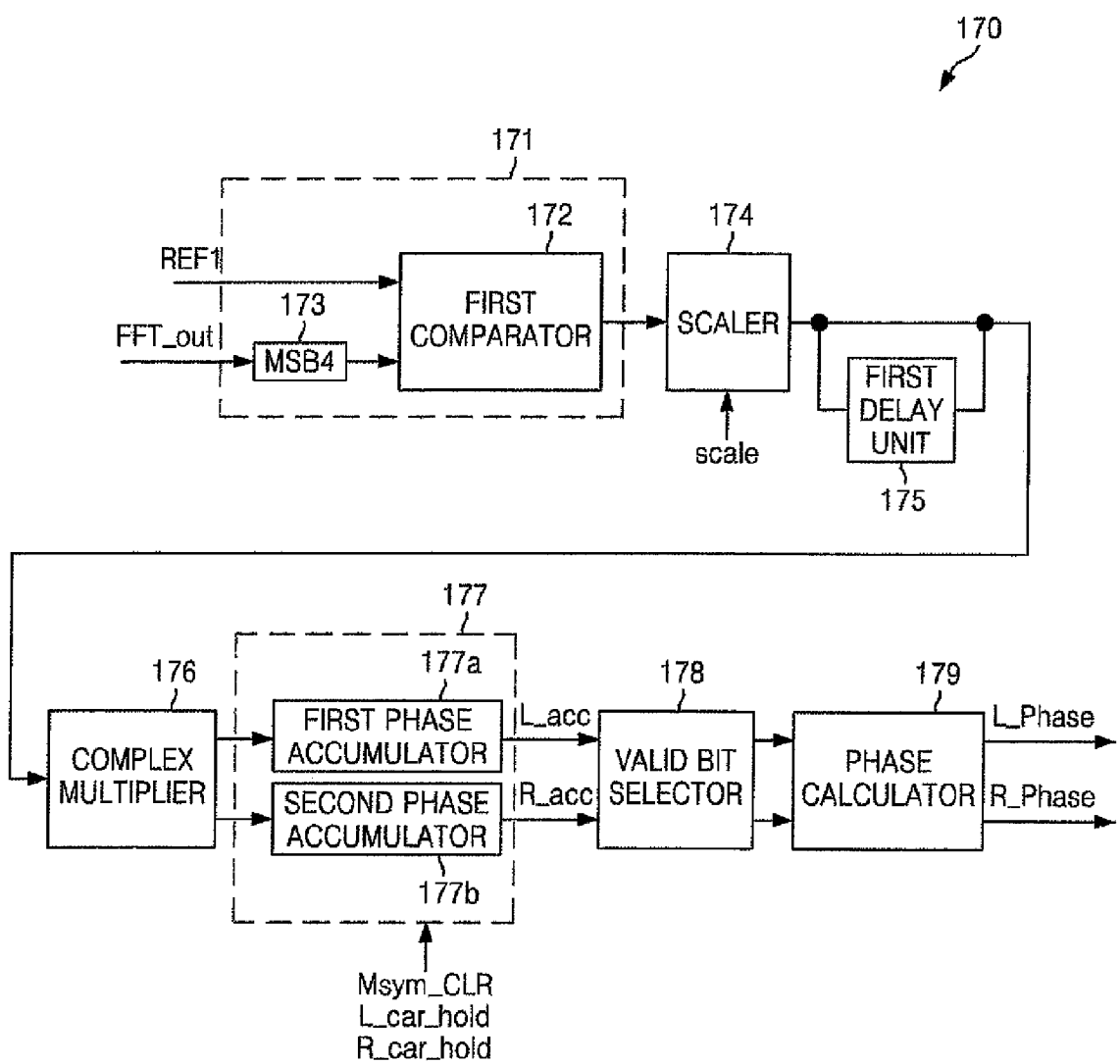
FIG. 3 is a block diagram of a phase calculation unit illustrated in FIG. 2 according to one or more embodiments of the present invention.

FIG. 3 is a block diagram of the phase calculation unit 170 illustrated in FIG. 2. Referring to FIG. 3, the phase calculation unit 170 of this example includes a comparison block 171, a scaler 174, a first delay unit 175, a complex multiplier 176, and a phase accumulation unit 177.

The comparison block 171 compares the FFT result FFT_out with a predetermined first reference value REF1 and outputs a comparison result. The comparison block 171 may compare only several upper bits (e.g., four upper bits) of the FFT result FFT_out with the first reference value REF1 using a bit selector 173 and a first comparator 172 in order to exclude a signal, which has a predetermined magnitude or greater and is difficult to be identified as data or noise, from sampling offset estimation.

The scaler 174 scales the comparison result output from the comparison block 171 based on a scale signal. For instance, a part of the FFT result FFT_out that is detected as having the predetermined magnitude by the comparison block 171 is multiplied by "0" and is thus excluded from sampling offset estimation. The scale signal may be generated by the control unit 140 based on the FFT result FFT_out.

The first delay unit 175 outputs a delayed FFT result by delaying the FFT result FFT_out for a predetermined symbol interval (d symbols). The complex multiplier 176 performs complex multiplication of the FFT result FFT_out and the delayed FFT result. The result of a k-th complex multiplication of an FFT result of an l-th symbol and the delayed FFT result may be expressed by Equation 4:

$$Y_{l,k} \cdot Y^*_{l-d,k} = r_{l,n} \cdot r^*_{l-d,n} + ICI + Wn \qquad (4)$$

$$= |X_{l,k}|^2 \cdot |H_{l,k}|^2 \cdot \exp\left(j\frac{2\pi k}{N}dN_s\zeta\right) \cdot$$

$$\exp\left(j\frac{2\pi k}{N}dN_s(1+\zeta)\right)$$

$$= M \cdot \exp\left(j\frac{2\pi dN_s}{N}(k\zeta + \Delta k + \Delta k\zeta)\right)$$

$$\cong M \cdot \exp\left(j\frac{2\pi dN_s}{N}(k\zeta + \Delta k)\right)$$

where d is the number of symbols for which the FFT result FFT_out is delayed, and M is a complex multiplication factor and corresponds to a value obtained by multiplying the square of the magnitude of a transmitting signal by the square of the magnitude of a receiving channel impulse response.

The phase accumulation unit 177 classifies a complex multiplication result into first pilot carriers (or pilot carriers having a positive index) and second pilot carriers (or pilot carriers having a negative index) based on the pilot carrier information L_car_hold and R_car_hold, and generates an accumulated phase value L_acc of the first pilot carriers and an accumulated phase value R_acc of the second pilot carriers. The phase accumulation unit 177 may include a first phase accumulator 177a and a second phase accumulator 177b, which respectively generate the first pilot carriers' accumulated phase value L_acc and the second pilot carriers' accumulated phase value R_acc with respect to OFDM symbols as many in number as the cumulative symbol count Msym_CLR.

The phase calculation unit 170 may further include a valid bit selector 178 and a phase calculator 170. In this case, the valid bit selector selects valid bits of each of the first pilot carriers' accumulated phase value L_acc and the second pilot carriers' accumulated phase value R_acc, and outputs the selected valid bits, and a phase calculator 179 calculates the sum of phases of the first pilot carriers (hereinafter, referred to as a first phase sum L_phase) and the sum of phases of the second pilot carriers (hereinafter, referred to as a second phase sum R_phase) based on the selected valid bits. A phase detector (not shown) may generate the phase difference Delta between the first-phase sum L_phase and the second phase sum R_phase. The number of valid bits selected by the valid bit selector 178 is the same as the number of input bits of the phase calculator 179. The phase calculator 179 may calculate the first phase sum L_phase and the second phase sum R_phase by performing a COordinate Rotation DIgital Computer (CORDIC) algorithm on the valid bits.

Figure 4:
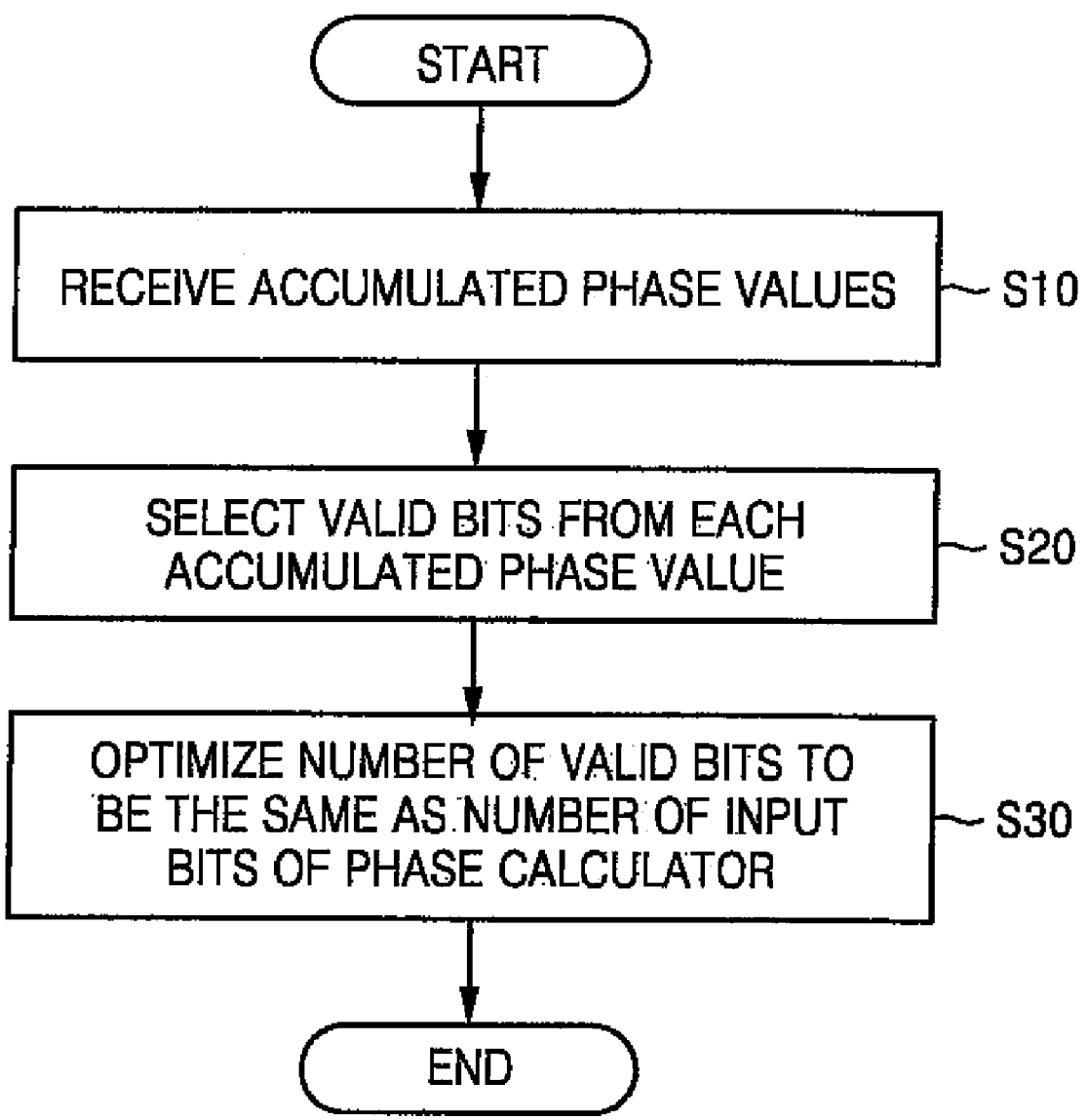
FIG. 4 is a flowchart showing the operations of a valid bit selector illustrated in FIG. 3 according to one or more embodiments of the present invention.

FIG. 4 is a flowchart showing operations of the valid bit selector 178 illustrated in FIG. 3. Referring collectively to FIGS. 3 and 4, the valid bit selector 178 receives the first pilot carriers' accumulated phase value L_acc and the second pilot carriers' accumulated phase value R_acc from the phase accumulation unit 177 (operation S10). The valid bit selector 178 selects valid bits of the first pilot carriers' accumulated phase value L_acc and valid bits of the second pilot carriers' accumulated phase value R_acc (operation S20). The valid bit selector 178 excludes consecutive 0 bits starting from a most significant bit (MSB) from values stored in a register (not shown), which stores the first pilot carriers' accumulated phase value L_acc and the second pilot carriers' accumulated phase value R_acc, thereby optimizing the number of valid bits to be the same as the number of input bits of the phase calculator 179 (operation S30). Operation S30 may be performed by shifting the values stored in the register.

When the sampling offset is less than 100 ppm in Equation (4), Δkξ is a very small value and can be thus omitted. When it is assumed that k is a scattered pilot, the transmitting signal X has the same value at the l-th symbol and the (l-d)-th symbol, receiving channels within d symbols have the same impulse response, and it is assumed that d=1 since a continual pilot exists in each symbol.

Continual pilot carriers have index values whose distribution is not regular but almost uniform. When a positive index value CP+ is the same as a negative index value CP−, Δk in Equation (4) can be eliminated by obtaining a difference between a phase of a pilot carrier having the positive index value CP+ and a phase of a pilot carrier having the negative index value CP−. Even if the positive index value CP+ and the negative index value CP− are not the same, the sampling offset can be obtained based on a difference between the sum of the phases of pilot carriers having the positive index value CP+ and the sum of the phases of pilot carriers having the negative index value CP−, since continual pilot carriers have index values whose distribution is uniform.

When the above-described characteristic is applied to Equation (4), the phase difference Delta (=δ) between the first phase sum L_phase and the second phase sum R_phase, which is output from the phase calculation unit 170, may be expressed by Equation (5):

$$\delta = \angle\left(\sum_{m \in CP+} M \cdot \exp\left(j\frac{2\pi d N_s}{N}(m\zeta + \Delta k)\right)\right) - \angle\left(\sum_{n \in CP-} M \cdot \exp\left(j\frac{2\pi d N_s}{N}(n\zeta + \Delta k)\right)\right) \quad (5)$$

where m indicates a pilot carrier having the positive index value CP+ and n indicates a pilot carrier having the negative index value CP−. In an accurate method, after a phase of each of the pilot carriers having the positive index value CP+ and a phase of each of the pilot carriers having the negative index value CP− are obtained, a difference of the sum of the phases of the pilot carriers having the positive index value CP+ and the sum of the phases of the pilot carriers having the negative index value CP− should be obtained. However, to reduce complexity in control and hardware, Equation (5) represents a simplified method in which a phase of the sum of the pilot carriers having the negative index value CP− is subtracted from a phase of the sum of the pilot carriers having the positive index value CP+.

Digital video broadcasting (DVB) standards substantially support three modes, i.e., 2K mode, 4K mode, and 8K mode for the FFT size. Since the number of carrier pilots is different among those modes, the number of carrier pilots that can be used in sampling offset estimation is also different. For instance, when Equation (5) corresponds to the 8K mode, Equation (5) should be used for accumulated two symbols in the 4K mode and for accumulated four symbols in the 2K mode in order to obtain the same accuracy of sampling offset estimation as it is used in the 8K mode.

Figure 5:
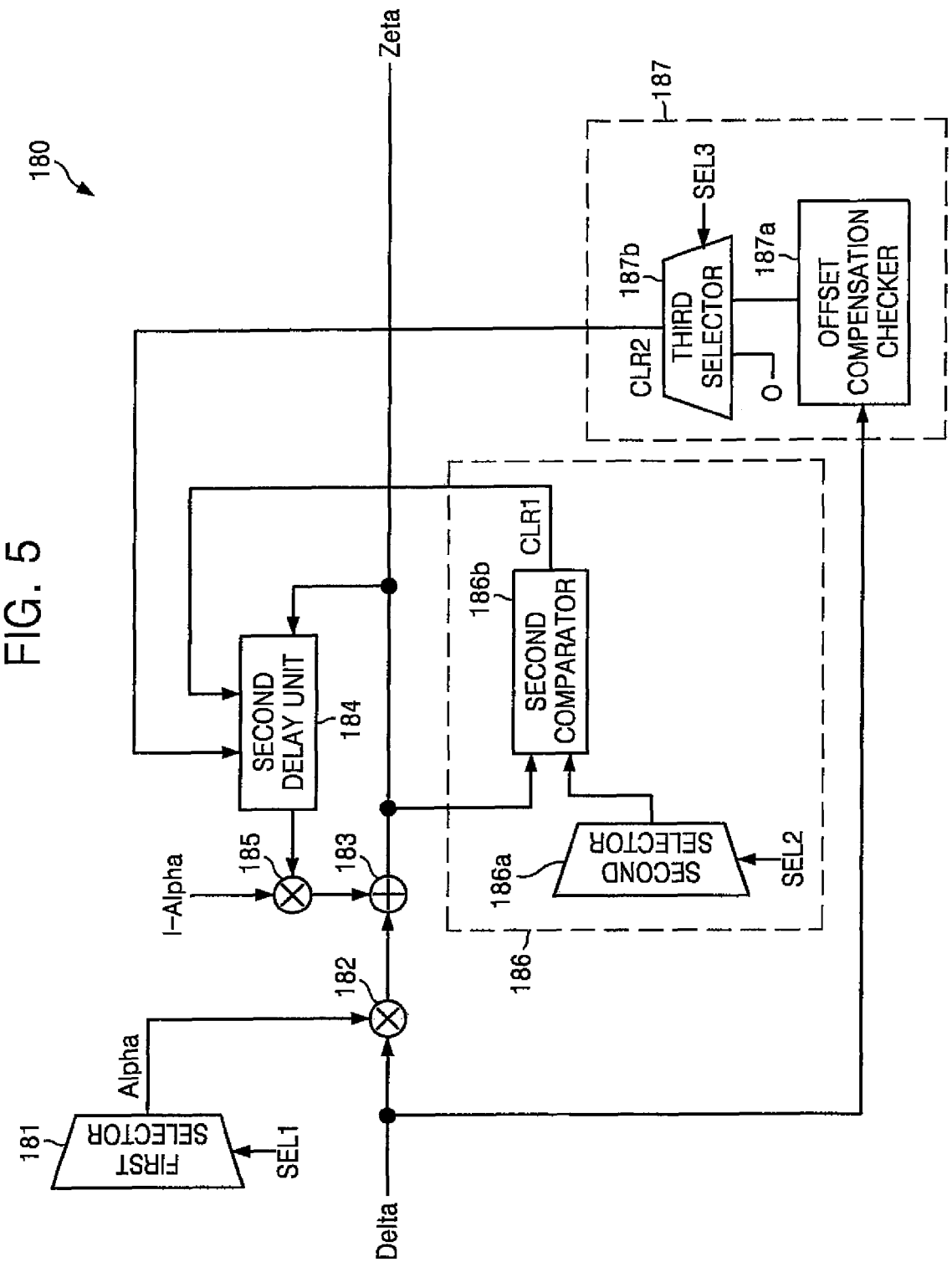
FIG. 5 is a block diagram of a first offset estimation unit illustrated in FIG. 2 according to one or more embodiments of the present invention.

FIG. 5 is a block diagram of the first offset estimation unit 180 illustrated in FIG. 2, which performs a forgetting factor algorithm on the phase difference Delta between the first phase sum L_phase and the second phase sum R_phase, and generates a first sampling offset value Zeta (=ξ). The first offset estimation unit 180 of this example includes a first selector 181, a first multiplier 182, a first adder 183, a second delay unit 184, a second multiplier 185, a first forgetting loop controller 186, and a second forgetting loop controller 187. The first adder 183, second delay unit 184, and second multiplier 185 define a forgetting loop of the first offset estimation unit 180.

The first multiplier 182 multiplies the phase difference Delta (=δ) by a first weight Alpha (=α). The first weight Alpha may be a value which is selected by the first selector 181 from among a plurality of values (e.g., 0.125, 0.0625, . . . , 0.0156) in response to a first selection signal SEL1.

The forgetting loop generates the first sampling offset value Zeta based on an output signal of the first multiplier 182, a delayed first sampling offset value for a predetermined symbol interval, and a second weight 1-Alpha. The second weight 1-Alpha may be a value obtained by subtracting the first weight Alpha from "1".

In the forgetting loop, the first adder 183 generates the first sampling offset value Zeta by adding the output signal of the first multiplier 182 and a value obtained by multiplying the delayed first sampling offset value by the second weight 1-Alpha. The second delay unit 184 generates the delayed first sampling offset value based on the first sampling offset value Zeta. The second multiplier 185 generates a result of multiplying the delayed first sampling offset value by the second weight 1-Alpha.

The first sampling offset value Zeta may be expressed by Equation (6) using the first weight Alpha and the second weight 1-Alpha:

$$\xi(n) = \alpha \cdot \delta(n) + (1-\alpha) \cdot \delta(n-1) \quad (6)$$

The first forgetting loop controller 186 initializes an accumulated value of the forgetting loop when the accumulated value is greater than a predetermined maximum value. When the accumulated value of the forgetting loop substantially increases, a lot of time is expended for the first sampling offset value Zeta to converge into "0" even if a sampling offset is compensated for, and therefore, the first forgetting loop controller 186 restricts the accumulated value to the predetermined maximum value. The first forgetting loop controller 186 may include a second selector 186a, which selects one from among a plurality of predetermined maximum values and outputs a selected maximum value, and a second comparator 186b, which compares the first sampling offset value Zeta with the maximum value selected by the second selector 186a and generates a first initialization signal CLR1 based on a comparison result.

The second forgetting loop controller 187 initializes the accumulated value of the forgetting loop when a predetermined period of time elapses after the initialization of the forgetting loop, so that the first sampling offset value Zeta is initialized to "0" right after a sampling offset is compensated for. The second forgetting loop controller 187 may include an offset compensation checker 187a, which checks whether the phase difference Delta is within a predetermined range to determine whether the sampling offset has been compensated for by, and a third selector 187b, which generates a second initialization signal CLR2 based on a checking result of the offset compensation checker 187a.

A value obtained using Equation (6) is a sampling offset value obtained in a frequency domain using only continual pilot carriers. When an interference of an analog signal occurs according to channels, a value obtained using Equation (5) changes. As a result, the sampling offset value of Equation (6) may be inaccurate. The inaccurate sampling offset value causes window drift, which causes inter-symbol interference (ISI). Consequently, a signal-to-noise ratio (SNR) of a receiving signal is decreased and the entire performance of a system is degraded. This phenomenon often occurs when digital broadcasting and analog broadcasting use the same channel. An OFDM receiver according to some embodiments of the present invention measures the amount of window drift and uses it for sampling offset estimation to accurately compensate for a sampling offset, thereby increasing the SNR of a receiving signal. The OFDM receiver may perform sampling offset estimation considering window drift using the second offset estimation unit 190.

Figure 6:
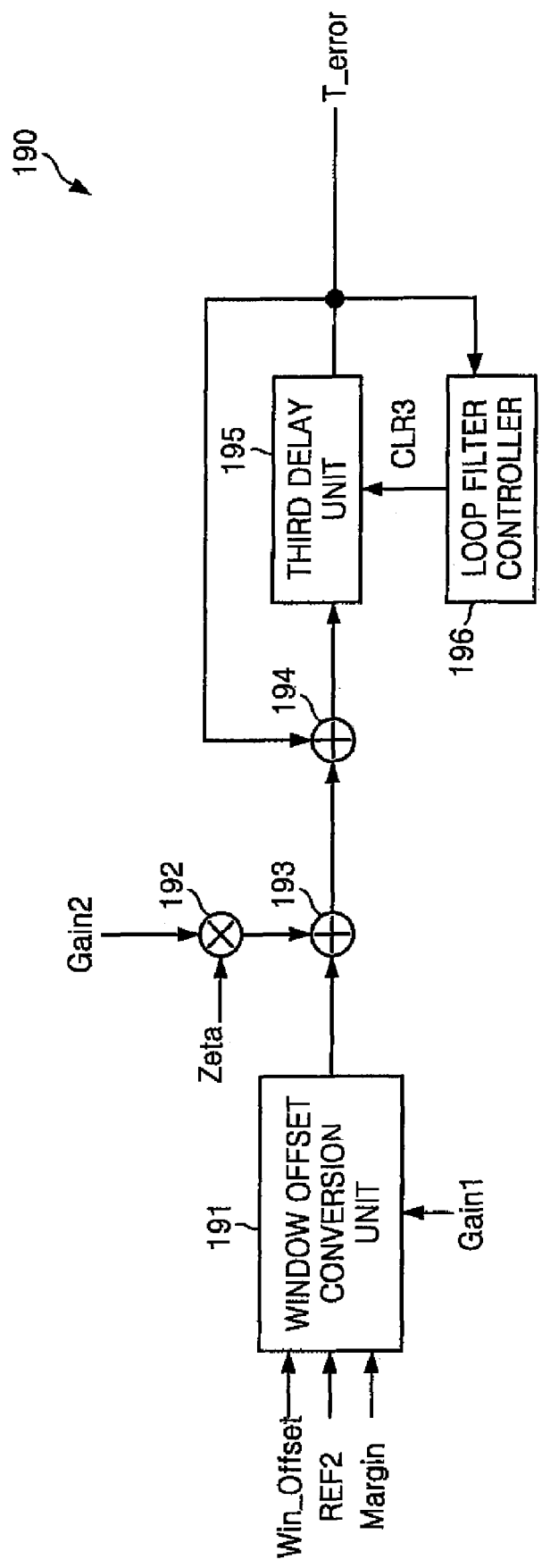
FIG. 6 is a block diagram of a second offset estimation unit illustrated in FIG. 2 according to one or more embodiments of the present invention.

FIG. 6 is a block diagram of the second offset estimation unit 190 illustrated in FIG. 2.

The second offset estimation unit 190 generates the sampling offset T_error based on the first sampling offset value Zeta and the receiving channel impulse response information Win_Offset. The second offset estimation unit 190 in the example of FIG. 6 includes a window offset conversion unit 191, a second adder 193, and a loop filter which includes a third adder 194 and a third delay unit 195.

The window offset conversion unit 191 converts a window drift value included in the receiving channel impulse response information Win_Offset into a unit of sampling offset, and outputs a converted window drift value. The second adder 193 adds the converted window drift value and the first sampling offset value Zeta. The loop filter filters an output signal of the second adder 193 to generate the sampling offset T_error. The second offset estimation unit 190 may further include a loop filter controller 196 as shown in FIG. 6 which initializes an accumulated value of the loop filter when the sampling offset T_error is greater than a predetermined maximum value.

Figure 7:
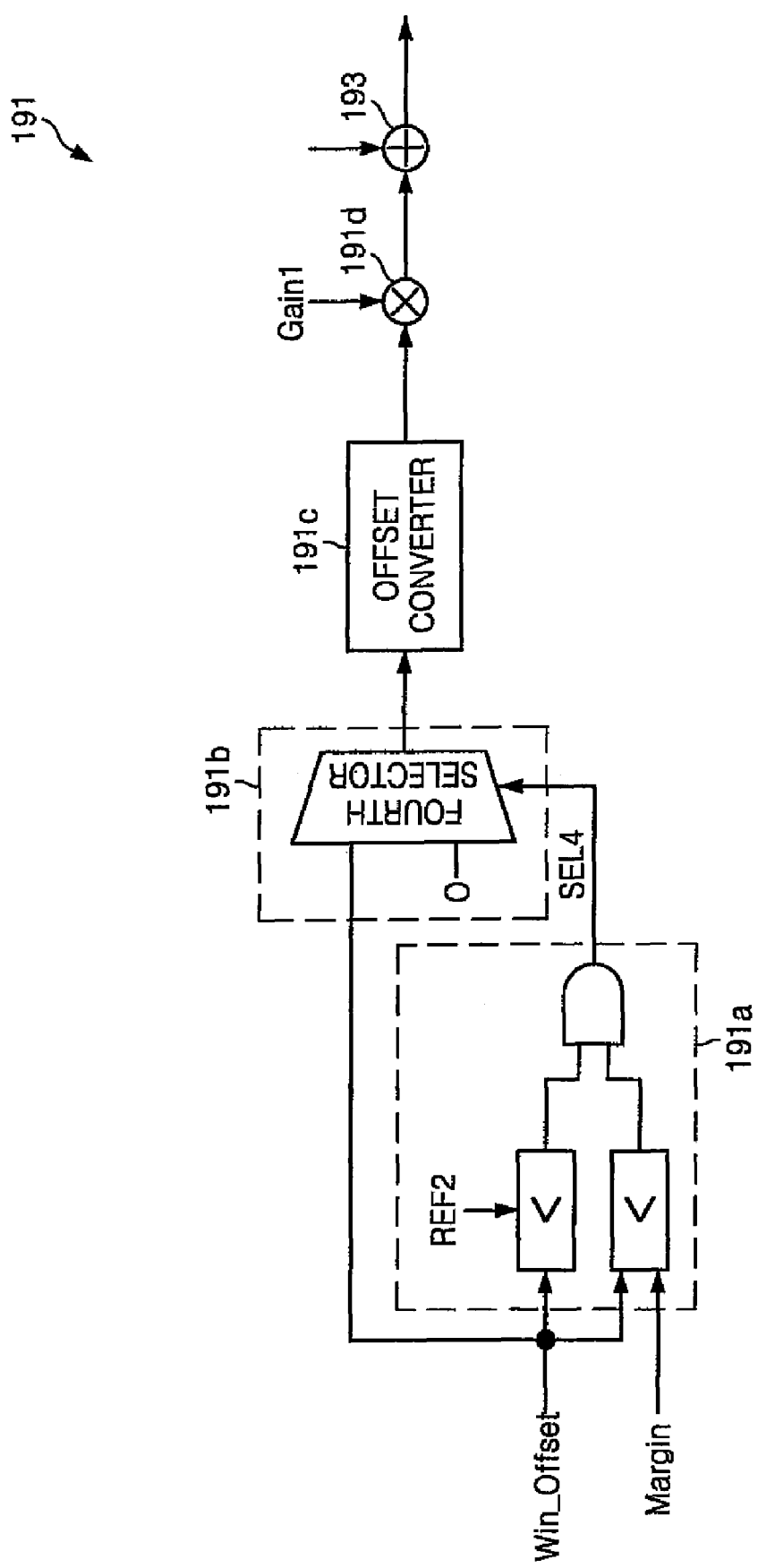
FIG. 7 is a block diagram of a window offset conversion unit illustrated in FIG. 6 according to one or more embodiments of the present invention.

FIG. 7 is a block diagram of the window offset conversion unit 191 illustrated in FIG. 6. Referring to FIG. 7, the window offset conversion unit 191 of this example includes a conversion controller and an offset converter 191c. The conversion controller excludes window drift values beyond a predetermined range from sampling offset calculation. The conversion controller includes a functional block 191a, which generates a fourth selection signal SEL4 based on whether the window drift value Win_Offset is within the predetermined range (e.g., a range between a margin and a second reference value REF2), and a fourth selector 191b, which selectively outputs the window drift value Win_Offset in response to the fourth selection signal SEL4. The offset converter 191c converts the window drift value Win_Offset into the unit of sampling offset and outputs the converted window drift value to the second adder 193.

Referring to FIGS. 6 and 7, the second offset estimation unit 190 may further include multipliers 191d and 192 which multiply the converted window offset drift value and the first sampling offset value Zeta by predetermined gain values Gain1 and Gain2, respectively, before the converted window offset drift value and the first sampling offset value Zeta are input to the second adder 193. The speed of sampling offset estimation can be controlled by adjusting the gain values Gain1 and Gain2.

As described above, according to the present invention, an OFDM receiver estimates a sampling offset based on a result of performing an FFT operation of a receiving signal and receiving channel impulse response information and compensates for the sampling offset based on a result of the estimation, thereby accomplishing accurate sampling offset estimation with respect to external interference signals (such as analog broadcasting signals) as well as noise channels having normal regular distribution. In other words, according to embodiments of the present invention, the OFDM receiver performs accurate sampling offset compensation, thereby increasing the signal-to-noise ratio (SNR) of the receiving signal.

While the present invention has been particularly shown and described with reference to exemplary embodiments thereof, it will be understood by those of ordinary skill in the art that various changes in forms and details may be made therein without departing from the spirit and scope of the present invention as defined by the following claims.

What is claimed is:

1. An orthogonal frequency division multiplexing (OFDM) receiver, comprising:
    an offset compensator configured to receive a digital input signal and a sampling offset, and to convert the digital input signal into a baseband signal in accordance with the sampling offset;
    a fast Fourier transform (FFT) block configured to perform an FFT operation of the base band signal output from the offset compensator and to output a corresponding FFT result;
    a control unit configured to generate OFDM symbol information and a plurality of control signals based on the FFT result;
    a channel impulse response estimation block configured to periodically generate receiving channel impulse response information of a receiving channel based on the FFT result; and
    a sampling offset estimation block configured to generate the sampling offset based on the FFT result, the receiving channel impulse response information, the OFDM symbol information, and the plurality of control signals.

2. The OFDM receiver of claim 1, wherein the channel impulse response estimation block comprises:
    an equalizer configured to compensate for a carrier distorted by the receiving channel with respect to the FFT result;
    an inverse discrete Fourier transform (IDFT) block configured to execute an IDFT of an output signal of the equalizer and to output a corresponding IDFT result; and
    a channel impulse estimator configured to generate the receiving channel impulse response information based on the IDFT result.

3. The OFDM receiver of claim 1, wherein the sampling offset estimation block comprises a carrier controller configured to generate pilot carrier information for classifying pilot carriers of an OFDM symbol into first pilot carriers and second pilot carriers according to positions and a cumulative symbol count indicating the number of OFDM symbols, with respect to which sampling offset estimation is performed, based on the OFDM symbol information.

4. The OFDM receiver of claim 3, wherein the sampling offset estimation block further comprises a phase calculation unit configured to perform complex multiplication of a result of performing the FFT operation of OFDM symbols as many in number as the cumulative symbol count and a result of delaying the FFT result for a predetermined OFDM symbol interval, to classify a result of the complex multiplication into the first pilot carriers and the second pilot carriers based on the pilot carrier information, and to generate a phase difference between a sum of phases of the first pilot carriers and a sum of phases of the second pilot carriers.

5. The OFDM receiver of claim 4, wherein the phase calculation unit comprises:
- a delay unit configured to delay the FFT result for the predetermined OFDM symbol interval;
- a complex multiplier configured to perform complex multiplication of the FFT result and the delayed FFT result; and
- a phase accumulation unit configured to classify the complex multiplication result into the first pilot carrier and the second pilot carriers based on the pilot carrier information, and to generate an accumulated phase value of the first pilot carriers and an accumulated phase value of the second pilot carriers.

6. The OFDM receiver of claim 5, wherein the phase calculation unit further comprises:
- a comparison block configured to compare the FFT result with a predetermined first reference value and to output a comparison result; and
- a scaler configured to scale the comparison result based on a scale signal.

7. The OFDM receiver of claim 6, wherein the comparison block comprises:
- a bit selector configured to select predetermined upper bits from the FFT result and to output the selected upper bits; and
- a comparator configured to compare the first reference value with the selected upper bits and to output the comparison result.

8. The OFDM receiver of claim 5, wherein the phase calculation unit further comprises:
- a valid bit selector configured to select valid bits of the accumulated phase value of the first pilot carriers and valid bits of the accumulated phase value of the second pilot carriers, and to output the selected valid bits;
- a phase calculator configured to calculate the sum of phases of the first pilot carriers and the sum of phases of the second pilot carriers based on the selected valid bits; and
- a phase detector configured to generate a phase difference between the sum of phases of the first pilot carriers and the sum of phases of the second pilot carriers.

9. The OFDM receiver of claim 8, wherein the number of the selected valid bits is the same as the number of input bits of the phase calculator, and the phase calculator calculates the sum of phases of the first pilot carriers and the sum of phases of the second pilot carriers by performing a COordinate Rotation Digital Computer (CORDIC) algorithm on the selected valid bits.

10. The OFDM receiver of claim 3, wherein the sampling offset estimation block further comprises an offset estimation unit configured to perform a forgetting factor algorithm on a phase difference between the sum of phases of the first pilot carriers and the sum of phases of the second pilot carriers, and to generate a sampling offset value.

11. The OFDM receiver of claim 10, wherein the offset estimation unit comprises:
- a first multiplier configured to multiply the phase difference by a first weight; and
- a forgetting loop configured to generate the sampling offset value based on an output signal of the first multiplier, a delayed sampling offset value for a predetermined symbol interval, and a second weight.

12. The OFDM receiver of claim 11, wherein the forgetting loop comprises:
- an adder configured to add the output signal of the first multiplier and a result of multiplying the delayed first sampling offset value for the predetermined symbol interval by the second weight, and to generate the sampling offset value;
- a delay unit configured to generate the delayed sampling offset value for the predetermined symbol interval based on the sampling offset value; and
- a second multiplier configured to generate the result of multiplying the delayed sampling offset value for the predetermined symbol interval by the second weight.

13. The OFDM receiver of claim 11 wherein the offset estimation unit further comprises a forgetting loop controller configured to initialize an accumulated value of the forgetting loop when the accumulated value is greater than a predetermined maximum value.

14. The OFDM receiver of claim 11, wherein the offset estimation unit further comprises a forgetting loop controller configured to initialize an accumulated value of the forgetting loop when a predetermined period of time elapses after the forgetting loop is initialized.

15. The OFDM receiver of claim 3, wherein the sampling offset estimation block further comprises an offset estimation unit configured to generate the sampling offset based on a sampling offset value and the receiving channel impulse response information.

16. The OFDM receiver of claim 15, wherein the offset estimation unit comprises:
- a window offset conversion unit configured to convert a window drift value included in the receiving channel impulse response information into a unit of sampling offset;
- an adder configured to add the converted window drift value and the sampling offset value; and
- a loop filter configured to filter an output signal of the adder to generate the sampling offset.

17. The OFDM receiver of claim 16, wherein the offset estimation unit further comprises a loop filter controller configured to initialize an accumulated value of the loop filter when the sampling offset is greater than a predetermined maximum value.

18. The OFDM receiver of claim 16, wherein the window offset conversion unit comprises:
- a conversion controller configured to exclude window drift values beyond a predetermined range from sampling offset estimation; and
- an offset converter configured to convert the window drift value into the unit of sampling offset, and to output the converted window drift value to the adder.

19. An orthogonal frequency division multiplexing (OFDM) receiver comprising:
- a sampling offset estimation block configured to generate a sampling offset based on a result of performing a fast Fourier transform (FFT) operation of a receiving signal, receiving channel impulse response information of a receiving channel, and OFDM symbol information and a plurality of control signals which are generated from a result of the FFT operation; and
- an offset compensator configured to compensate for the sampling offset of the receiving signal, to convert the receiving signal into a baseband signal, and to output the baseband signal.

20. The OFDM receiver of claim 19, wherein the sampling offset estimation block comprises:
- a carrier controller configured to generate pilot carrier information for classifying pilot carriers of an OFDM symbol into first pilot carriers and second pilot carriers according to positions and a cumulative symbol count indicating the number of OFDM symbols, with respect to which sampling offset estimation is performed, based on the OFDM symbol information;

a phase calculation unit configured to perform complex multiplication of the result of performing the FFT operation of OFDM symbols as many in number as the cumulative symbol count and a result of delaying the result of the FFT operation for a predetermined OFDM symbol interval, to classify a result of the complex multiplication into the first pilot carriers and the second pilot carriers based on the pilot carrier information, and to generate a phase difference between a sum of phases of the first pilot carriers and a sum of phases of the second pilot carriers;

a first offset estimation unit configured to perform a forgetting factor algorithm on the phase difference between the sum of phases of the first pilot carriers and the sum of phases of the second pilot carriers, and to generate a first sampling offset value; and a second offset estimation unit configured to generate the sampling offset based on the first sampling offset value and the receiving channel impulse response information.

21. The OFDM receiver of claim 20, wherein the second offset estimation unit comprises:

a window offset conversion unit configured to convert a window drift value included in the receiving channel impulse response information into a unit of sampling offset;

an adder configured to add the converted window drift value and the first sampling offset value; and a loop filter configured to filter an output signal of the adder to generate the sampling offset.

22. The OFDM receiver of claim 21, wherein the second offset estimation unit further comprises a loop filter controller configured to initialize an accumulated value of the loop filter when the sampling offset is greater than a predetermined maximum value.

23. The OFDM receiver of claim 21, wherein the window offset conversion unit comprises:

a conversion controller configured to exclude window drift values beyond a predetermined range from sampling offset estimation; and an offset converter configured to convert the window drift value into the unit of sampling offset, and to output the converted window drift value to the adder.

* * * * *